(12) United States Patent
Ueno

(10) Patent No.: US 10,852,318 B2
(45) Date of Patent: Dec. 1, 2020

(54) METHOD OF MANUFACTURING PHYSICAL QUANTITY SENSOR DEVICE AND PHYSICAL QUANTITY SENSOR DEVICE

(71) Applicant: FUJI ELECTRIC CO., LTD., Kawasaki (JP)

(72) Inventor: Fumiya Ueno, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 186 days.

(21) Appl. No.: 15/866,028

(22) Filed: Jan. 9, 2018

(65) Prior Publication Data

US 2018/0238928 A1 Aug. 23, 2018

(30) Foreign Application Priority Data

Feb. 23, 2017 (JP) .................. 2017-032740

(51) Int. Cl.
| | |
|---|---|
| *G01P 15/125* | (2006.01) |
| *G01F 1/684* | (2006.01) |
| *G01F 1/692* | (2006.01) |
| *F02D 41/18* | (2006.01) |
| *G01F 5/00* | (2006.01) |
| *G01F 15/14* | (2006.01) |
| *G01L 19/00* | (2006.01) |
| *G01L 9/00* | (2006.01) |

(Continued)

(52) U.S. Cl.
CPC ............ *G01P 15/125* (2013.01); *F02D 41/18* (2013.01); *G01F 1/684* (2013.01); *G01F 1/6842* (2013.01); *G01F 1/692* (2013.01); *G01F 5/00* (2013.01); *G01F 5/005* (2013.01); *G01F 15/14* (2013.01); *G01L 9/005* (2013.01); *G01L 9/0054* (2013.01); *G01L 19/0069* (2013.01); *G01L 19/0084* (2013.01); *G01L 19/142* (2013.01); *G01L 19/147* (2013.01); *G01P 1/023* (2013.01); *G01P 15/123* (2013.01)

(58) Field of Classification Search
CPC ....... G01P 15/125; G01F 1/6842; G01F 1/692
USPC .......................................................... 73/488
See application file for complete search history.

(56) References Cited

U.S. PATENT DOCUMENTS

| | | | | |
|---|---|---|---|---|
| 4,718,278 A | * | 1/1988 | Bergsma | ............... G01L 9/0057 |
| | | | | 338/42 |
| 5,228,334 A | * | 7/1993 | Stone | .................. G01L 19/0609 |
| | | | | 73/114.43 |

(Continued)

FOREIGN PATENT DOCUMENTS

| | | |
|---|---|---|
| JP | 2017-037039 A | 2/2017 |
| WO | WO-2013/118843 A1 | 8/2013 |

*Primary Examiner* — John Fitzgerald
*Assistant Examiner* — Rodney T Frank
(74) *Attorney, Agent, or Firm* — Rabin & Berdo, P.C.

(57) ABSTRACT

An inner housing part has through-holes for connecting first lead pins (power supply terminal, output terminal, ground terminal) with the connector pins. The inner housing part has grooves that house second lead pins for adjusting output signals of a sensor chip. Three of the grooves each has a shape in which a distance between opposing sides of the groove is less than a diameter of the second lead pin that corresponds to the groove. The inner housing part is fixed to a case by a thermoset adhesive so as to house lead pins arranged in the case included in a sensor element. The second lead pins are fitted in the grooves, suppressing lifting of the inner housing part during curing of the adhesive.

16 Claims, 19 Drawing Sheets

(51) Int. Cl.
*G01L 19/14* (2006.01)
*G01P 1/02* (2006.01)
*G01P 15/12* (2006.01)

(56) References Cited

U.S. PATENT DOCUMENTS

| | | | | |
|---|---|---|---|---|
| 5,343,754 A | * | 9/1994 | Stone | G01L 9/0057 138/42 |
| 5,343,757 A | * | 9/1994 | Tate | G01L 9/0072 361/283.3 |
| 6,070,469 A | * | 6/2000 | Taniguchi | G01L 19/0038 73/720 |
| 2014/0338448 A1 | * | 11/2014 | Ashino | G01P 15/08 73/488 |

* cited by examiner

METHOD OF MANUFACTURING PHYSICAL QUANTITY SENSOR DEVICE AND PHYSICAL QUANTITY SENSOR DEVICE

CROSS REFERENCE TO RELATED APPLICATIONS

This application is based upon and claims the benefit of priority of the prior Japanese Patent Application No. 2017-032740, filed on Feb. 23, 2017, the entire contents of which are incorporated herein by reference.

BACKGROUND OF THE INVENTION

1. Field of the Invention

Embodiments of the invention relate to a method of manufacturing a physical quantity sensor device and physical quantity sensor device.

2. Description of the Related Art

Numerous physical quantity sensors are used in automobiles and industrial equipment. Physical quantity sensors include pressure sensors, acceleration sensors, etc. and are often used in harsh environments with high temperatures and humidity. According to a proposed technique, in a physical quantity sensor device, the package is configured by a screw part and a nut part (case) in which a sensing element is disposed in a recess, and a socket part constituting an interface for propagating sensing element signals externally (for example, refer to International Publication No. WO 2013/118843). For instance, with the technique proposed in International Publication No. WO 2013/118843, a signal output terminal for connection to external wiring is fixed to the sensing element. Further, the signal output terminal pass through a through-hole of the bottom of the recess of the nut part to be sealed and fixed to the socket part.

SUMMARY OF THE INVENTION

According to one embodiment of the present invention, in a method of manufacturing a physical quantity sensor device, the physical quantity sensor device includes: a measured-medium intake part that has an intake hole that guides a measured medium that is one of a gas subject to measurement and a liquid subject to measurement; a sensor element in which first terminals are arranged, the sensor element being fixed on a base so as to cover the intake hole, the base being provided at one end of the intake hole of the measured-medium intake part; and a first housing part that sandwiches the sensor element with the measured-medium intake part and that houses the first terminals, a second terminal forming a connector part for external wiring is arranged in the first housing part. The method includes fixing the first housing part to the sensor element by a thermoset adhesive. A first hole among holes that are of the first housing part and configured to house the first terminals, has a cross-sectional shape in which a distance between opposing sides of a cross-section of the first hole is less than a diameter of a first terminal corresponding to the first hole.

In the embodiment, one to three first holes are provided.

In the embodiment, three first holes are provided.

In the embodiment, a sensor chip that includes a sensor and a control circuit electrically connected to the sensor is arranged in the sensor element. The first terminals have third terminals electrically connecting the control circuit and the second terminal, and fourth terminals for adjustment and/or trimming of the control circuit. The first hole is a hole configured to house a predetermined terminal of the fourth terminals.

In the embodiment, a sensor chip that includes a sensor and a control circuit electrically connected to the sensor is arranged in the sensor element. The first terminals have third terminals that electrically connect the control circuit and the second terminal, and fourth terminals for adjustment and/or trimming of the control circuit. Second holes that are among the holes and configured to house the third terminals are through-holes. Third holes that are among the holes and configured to house the fourth terminals are grooves. The second terminal is integrated with the first housing part and has a first part that in the first housing part, is connected to one of the through-holes of the first housing part. In fixing the first housing part to the sensor element by a thermoset adhesive, the third terminals are inserted in the through-holes of the first housing part and the fourth terminals are inserted in the grooves of the first housing part.

In the embodiment, the first housing part is constituted by: a second housing part that sandwiches the sensor element with the measured-medium intake part and houses the first terminals, the second terminal forming the connector part for the external wiring is arranged in the second housing part; and a third housing part that sandwiches the second housing part with the sensor element and houses the second terminal.

According to another embodiment of the present invention, a physical quantity sensor device includes a measured-medium intake part having an intake hole that guides a measured medium that is one of a gas subject to measurement and a liquid subject to measurement, the measured-medium intake part having a base provided at one end of the intake hole; a sensor element fixed on the base so as to cover the intake hole; first terminals arranged in the sensor element; a first housing part that sandwiches the sensor element with the measured-medium intake part and houses the first terminals, the first housing part being fixed to the sensor element; and a second terminal forming a connector part for external wiring and joined to a predetermined terminal among the first terminals and arranged in the first housing part. A first hole among holes that are of the first housing part and configured to house the first terminals, has a cross-sectional shape in which a distance between opposing sides of a cross-section of the first hole is less than a diameter of a first terminal corresponding to the first hole.

In the embodiment, one to three first holes are provided.

In the embodiment, three first holes are provided.

In the embodiment, a sensor chip that includes a sensor and a control circuit electrically connected to the sensor is arranged in the sensor element. The first terminals have third terminals electrically connecting the control circuit and the second terminal, and fourth terminals for adjustment and/or trimming of the control circuit. The first hole is a hole configured to house a predetermined terminal of the fourth terminals.

In the embodiment, a sensor chip that includes a sensor and a control circuit electrically connected to the sensor is arranged in the sensor element. The first terminals have third terminals that electrically connect the control circuit and the second terminal, and fourth terminals for adjustment and/or trimming of the control circuit. Second holes that are among the holes and configured to house the third terminals are through-holes. Third holes that are among the holes and configured to house the fourth terminals are grooves. The second terminal is integrated with the first housing part and has a first part that is exposed by the through-holes of the first housing part. The third terminals penetrate the through-holes of the first housing part and are electrically connected to the second terminal by the first part. The fourth terminals are inserted in the grooves of the first housing part.

In the embodiment, the first housing part is constituted by: a second housing part that sandwiches the sensor element with the measured-medium intake part and houses the first terminals, the second terminal forming the connector part for the external wiring is arranged in the second housing part; and a third housing part that sandwiches the second housing part with the sensor element and houses the second terminal.

Objects, features, and advantages of the present invention are specifically set forth in or will become apparent from the following detailed description of the invention when read in conjunction with the accompanying drawings.

DETAILED DESCRIPTION OF THE INVENTION

Figure 1:
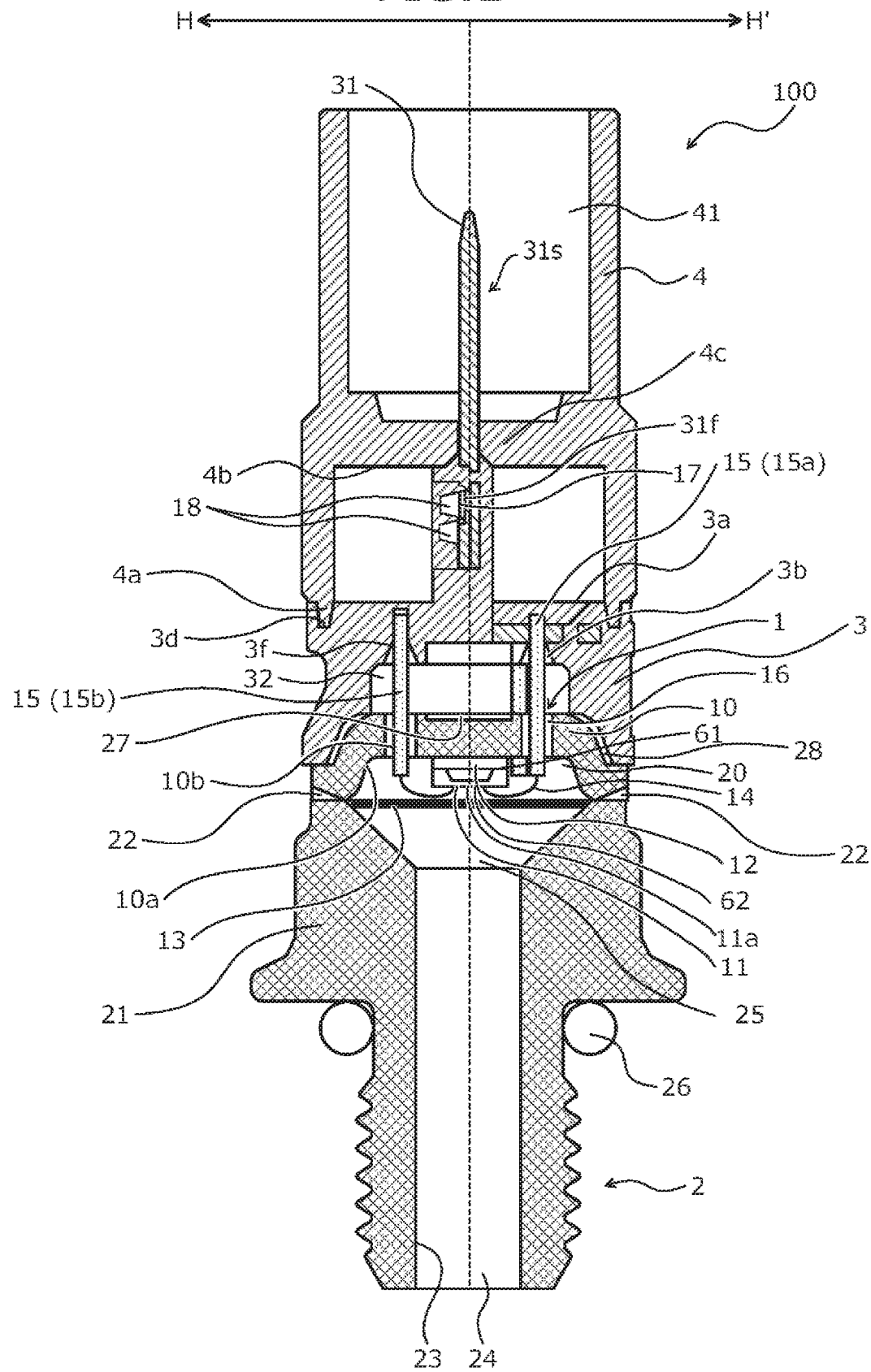
FIG. 1 is a cross-sectional view of a configuration of a physical quantity sensor device according to a first embodiment.

With the technique described in International Publication No. WO 2013/118843, the following problems arise. In the method of assembling (manufacturing) the physical quantity sensor device, in a process of adhering the nut part and the socket part, a thermoset adhesive is used. When a thermoset adhesive is used, the adhesive may be applied in a usual temperature state; however, after application of the adhesive until the adhesive is cured, a high temperature state has to be maintained for a long period. When the socket part is a light-weight material such as resin and is left in a high-temperature environment for a long period of time, the socket part may lift, forming a gap between the nut part and the socket part. In such a case, the adhesive strength between the nut part and the socket part after curing may decrease or failure in the signal propagating function may occur. Further, to prevent such occurrences, for example, the two members have to be pressed together by an external force when left in the high-temperature environment for a long period and assembly becomes more sophisticated.

Embodiments of a method of manufacturing a physical quantity sensor device and a physical quantity sensor device according to the present invention will be described in detail with reference to the accompanying drawings. In the description of the embodiments, components that are similar are given the same reference numerals and redundant description is omitted.

Figure 2A:
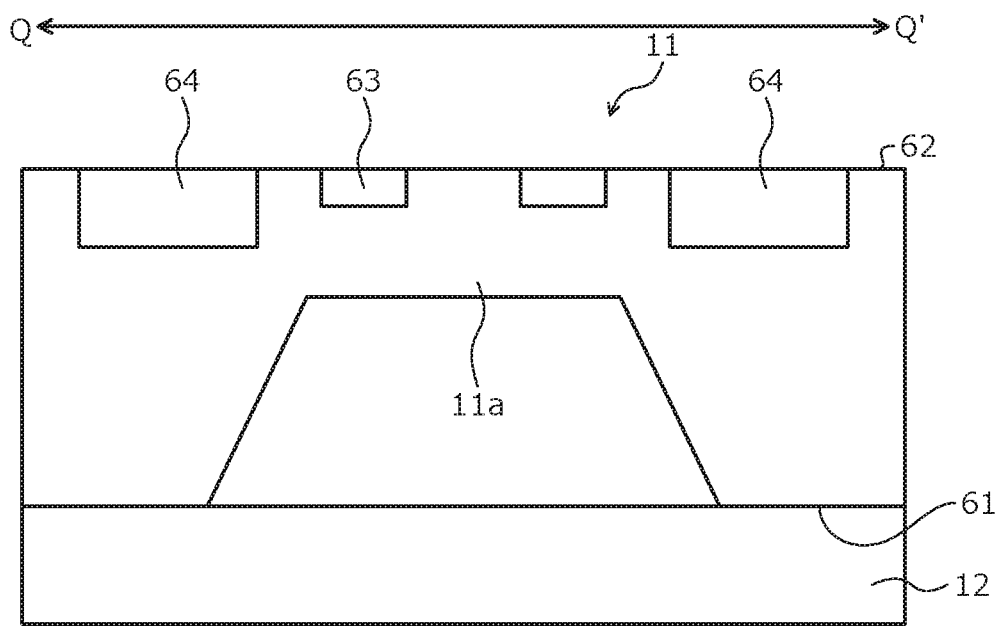
FIG. 2A is a cross-sectional view of a pressure sensor chip.
Figure 2B:
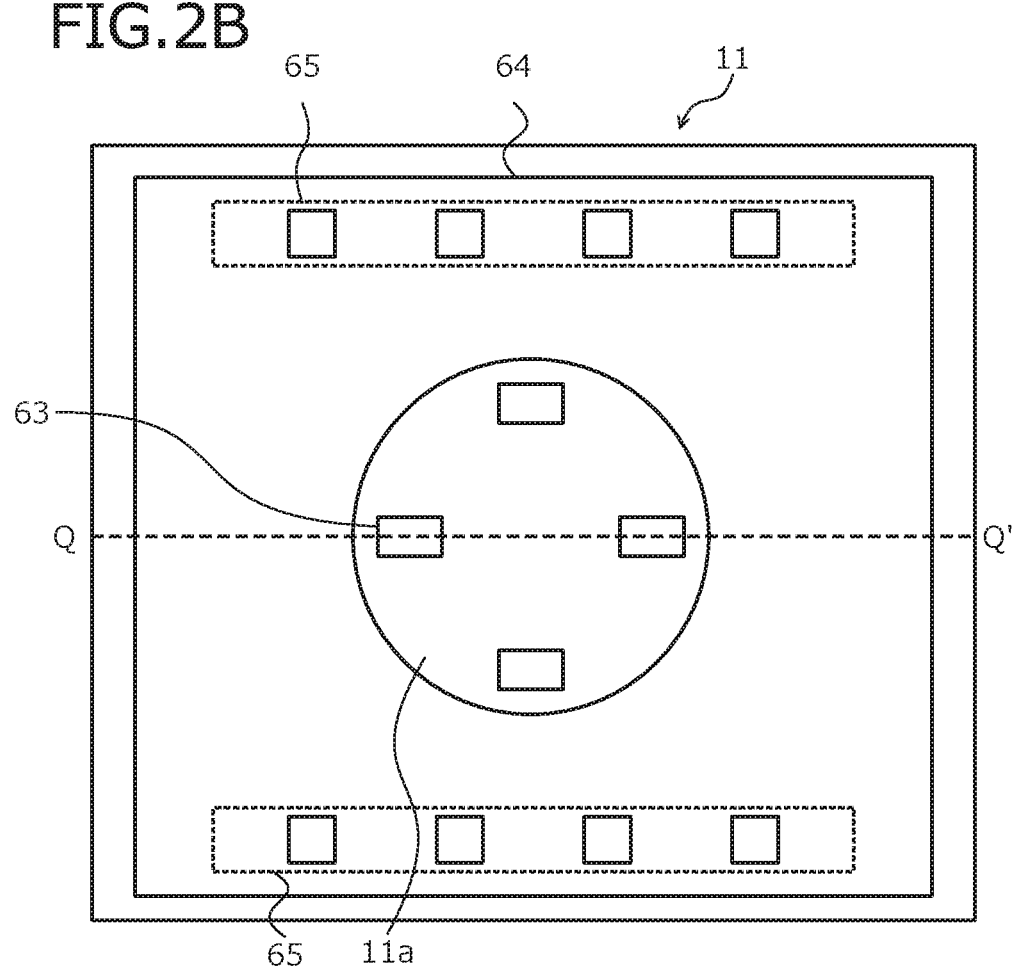
FIG. 2B is a plan view of the pressure sensor chip.

Configuration of the physical quantity sensor device according to a first embodiment will be described taking a pressure sensor device as an example. FIG. 1 is a cross-sectional view of the configuration of the physical quantity sensor device according to the first embodiment. FIGS. 2A and 2B are diagrams of the configuration of a pressure sensor chip depicted in FIG. 1. FIG. 2A is a cross-sectional view of a pressure sensor chip 11 and FIG. 2B is a plan view of the pressure sensor chip 11. As depicted in FIG. 1, a physical quantity sensor device 100 includes a sensor element 1, a screw part 2 (measured-medium intake part), an inner housing part (second housing part) 3, and a socket housing part (connector housing part (third housing part)) 4. In the present embodiment, a socket part constituting an interface for propagating sensing element signals externally is configured to be separate from both the inner housing part 3 and the socket housing part 4. The sensor element 1 includes a case 10 as well as the pressure sensor chip (semiconductor chip) 11, a base member 12, and a diaphragm 13, each housed in a recess 10a of the case 10. The cross-section depicted in FIG. 1 is a cross-section at the position of a cross-section H-H' depicted in FIG. 12B described hereinafter. The case 10, for example, is made of a metal such as stainless steel (SUS) or the like.

Here, the pressure sensor chip 11 will be described with reference to FIGS. 2A and 2B. A cross-section depicted in FIG. 2B is a cross-section a position of a cross-section Q-Q' depicted in FIG. 2A. As depicted in FIGS. 2A and 2B, the pressure sensor chip 11 has, for example, a diaphragm 11a, four gauge resistors 63, and a pad member 65. The diaphragm 11a is a member that is subjected to pressure and is formed by processing that forms a recess from a first surface 61 of semiconductor silicon. The first surface 61 is the upper surface in FIG. 1. The pressure sensor chip 11 is subjected to pressure via the diaphragm 11a. The four gauge resistors 63 are formed on a second surface 62 of the semiconductor silicon, the second surface 62 corresponds to a rear side of the diaphragm 11a. The second surface 62 is the lower surface in FIG. 1. The four gauge resistors 63 are constituted by diffused resistors. The gauge resistors 63 convert into values of resistance, distortion that is generated at the second surface 62 when pressure is applied to the pressure sensor chip 11. The pressure sensor chip 11 may be made of another semiconductor material.

In the pressure sensor chip 11, a pressure sensor such as a Wheatstone bridge circuit configured by the gauge resistors 63, a control circuit, etc. are formed. The control circuit is formed in a control circuit region 64 of the second surface 62. A control circuit is a circuit that amplifies output signals of the pressure sensor, a circuit that compensates sensitivity, a circuit that compensates offset, a circuit that compensates sensitivity and offset temperature characteristics, etc. Further, in the pressure sensor chip 11, a surge protection element, a filter (not depicted), etc. are formed. The pad member 65 is formed on the second surface 62 of the pressure sensor chip 11. Electrodes provided on the pad member 65 are each connected to lead pins (first terminal) 15 by bonding wire 14. The electrodes provided on the pad member 65 are connected by, for example, metal wiring to control circuits formed in the control circuit region 64. In other words, the lead pins 15 are connected, via the bonding wire 14 and the electrodes provided on the pad member 65, to the control circuits formed in the control circuit region 64. Further, the pad member 65 and the control circuit region 64 are disposed in a portion of the second surface 62, exclusive of a region where the diaphragm 11a is provided. The pad member 65 may be disposed in a portion of the control circuit region 64.

The first surface 61 of the pressure sensor chip 11 is fixed to a bottom of the recess 10a of the case 10, via the base member 12. Although not particularly limited hereto, the base member 12 may be made of, for example, a glass material, i.e., Pyrex (registered trademark) glass, tempered glass, etc. The base member 12 and the pressure sensor chip 11 are joined by electrostatic bonding. The base member 12 and the case 10 are adhered by an adhesive (not depicted). The lead pin 15 is a terminal pin for leading out signals of the sensor element 1 and is provided in plural.

Each of the lead pins 15 passes through a different through-hole 10b of the case 10 to thereby penetrate the case 10 and is fixed to the case 10 by, for example, an insulating material 16, such as glass, that blocks the through-hole 10b. One end (hereinafter, lower end) of the lead pin 15 protrudes downward (toward the screw part 2) from the recess 10a of the case 10 and is connected by the bonding wire 14, to the electrodes provided on the pad member 65 on the second surface 62 of the pressure sensor chip 11. The other end (hereinafter, upper end) of the lead pin 15 protrudes upward (toward the socket housing part 4) from the side of the case 10, opposite the recess 10a side of the case 10. A recess 27 is provided on the side of the case 10, opposite the recess 10a side of the case 10. The recess 27 is provided to suppress stress from concentrating at the insulating material 16.

In particular, the lower ends of lead pins (hereinafter, first lead pins (third terminal)) 15a that among the lead pins 15, are a power supply terminal, a ground terminal and an output terminal, are each connected by the bonding wire 14 to the electrodes of the pressure sensor. The upper ends of the first lead pins 15a penetrate through-holes 3b of the inner housing part 3.

Meanwhile, the lower ends of lead pins (hereinafter, second lead pins (fourth terminal)) 15b that among the lead pins 15, are for property adjustment/trimming, are each connected by the bonding wire 14 to the electrodes of a predetermined control circuit. The second lead pins 15b are used to perform property adjustment/trimming during assembly of the physical quantity sensor device 100 and are not used after the property adjustment/trimming. Lengths of the first lead pins 15a and the second lead pins 15b are the same.

Here, a vertical direction is an axial direction of the lead pins 15. A horizontal direction is a direction orthogonal to the axial direction of the lead pins 15. The lead pins 15 are made of, for example, 42 Alloy, a metal such as an iron-nickel alloy (50 Ni—Fe) containing about 50 wt % of nickel (Ni) and iron (Fe) for the remaining percentage.

The screw part 2, for example, is made of a metal such as SUS. At a center of the screw part 2, a through-hole (intake hole) 23 through which a measured medium such as air as a gas subject to measurement, an oil as a liquid subject to measurement, etc. passes is provided in the vertical direction. An opening of a through-hole 23 at a first open end of the screw part 2 is a pressure inlet 24. The case 10 is placed on a base 21 provided at a second open end of the screw part 2, so that an opening 25 of the through-hole 23 at the second open end of the screw part 2 and the recess 10a of the case 10 face each other, and the diaphragm 13 is between the case 10 and the base 21. A vicinity of the location where the case 10, the diaphragm 13, and the base 21 of the screw part 2 are stacked on each other is joined by laser welding.

The diaphragm 13 is a thin wavy metal plate made of, for example, a metal such as SUS. The diaphragm 13 is disposed so as to block the opening of the recess 10a of the case 10 and the second open end of the screw part 2. A space surrounded by the recess 10a of the case 10 and the diaphragm 13 is filled with a liquid (pressure medium) 20 that transmits pressure to the pressure sensor chip 11, such as silicon oil. Reference numeral 22 of the vicinity of the location (junction) where the case 10, the diaphragm 13, and the base 21 of the screw part 2 are stacked on each other indicates the welded part of the case 10 and the base 21 of the screw part 2. Reference numeral 26 indicates an O-ring.

The inner housing part 3 is a resin member integrally formed with connector pins (external lead terminals and auxiliary terminal) 31, and has a substantially recessed shape that surrounds a vicinity of and a top of the sensor element 1. In particular, the inner housing part 3 is adhered by an adhesive 28, to an outer periphery of the case 10, on a side thereof opposite the recess 10a side of the case 10. The adhesive 28 is interposed between substantially the entire contact surfaces of the case 10 and the inner housing part 3. One of the contact surfaces of the inner housing part 3 and the case 10 may have a cross-sectional shape where recesses and protrusions are alternately arranged repeatedly (for example, jagged like a serrated blade) and the amount of adhesive on the contact surface may be increased to facilitate adhesion of the inner housing part 3 and the case 10. A recess 32 of the inner housing part 3 has a depth that enables housing of the second lead pins 15b.

The through-holes 3b through which the first lead pins 15a penetrate are provided in a portion 3a (hereinafter, a top 3a of the inner housing part 3) of the inner housing part 3 covering the sensor element 1. Further, at the top 3a of the inner housing part 3, the connector pins 31 are integrally formed. The connector pins 31 are signal terminals that communicate signals between the physical quantity sensor device 100 and an external device. A first end 31a of the connector pins 31 (refer to FIGS. 3A to 3D described hereinafter) has a through-hole 31e that is connected to the through-hole 3b of the inner housing part 3. In a recess 31f provided in a vertical part 31c (refer to FIGS. 3A to 3D described hereinafter) of the connector pins 31, a chip capacitor 18 is attached by a joining member 17. The chip capacitor 18 is attached between adjacent connector pins 31. A configuration of the connector pins 31 will be described with reference to FIGS. 2A and 2B.

During assembly, laser light is irradiated onto the upper end of the first lead pins 15a and the first end 31a of the connector pins 31. The laser light is irradiated from the top, at a predetermined angle of incidence (about a 3-degree incline angle with respect to the vertical direction). The upper ends of the first lead pins 15a are joined to the first ends 31a of the connector pins 31 by this laser welding. The connector pins 31 are made of, for example, a metal such as phosphor bronze (an alloy of copper (Cu) containing tin (Sn)), 42 alloy, 50 Ni—Fe, etc. The connector pins 31 and the lead pins 15 are joined by the irradiation of laser light so as to be welded to each other.

The socket housing part 4 is a connection part that is connected to external wiring and in which the vertical parts 31c (refer to FIGS. 3A to 3D described hereinafter) of the connector pins 31 are housed, the portions of the vertical parts 31c extending from the inner housing part 3 being connector parts 31s configured to be connected to external wiring. The socket housing part 4 has, for example, a substantially cylindrical shape that surrounds a periphery of the vertical parts 31c of the connector pins 31. For example, the connector pins 31 penetrate through-holes 4c in a bottom 4b of the socket housing part 4 and protrude into a space 41 surrounded by the socket housing part 4. The socket housing part 4 is adhered by an adhesive (not depicted), to an outer periphery on the top 3a of the inner housing part 3. The adhesive is interposed between substantially the entire contact surfaces of the inner housing part 3 and the socket housing part 4. A recess 3d and a protrusion 4a that fit into each other may be provided at joining aspects of the socket housing part 4 and the inner housing part 3.

Maximal diameters of the socket housing part 4, the inner housing part 3, the case 10, and the base 21 of the screw part 2 may be substantially equal. The reason for this is as follows. As described, the screw part 2, the case 10, the inner housing part 3, and the socket housing part 4 are sequentially overlapped and joined (or bonded). Therefore, by configuring the maximal diameters of the base 21 of the screw part 2, the case 10, the inner housing part 3, and the socket housing part 4 to be substantially equal, size reductions along the diameter direction (the horizontal direction) may be facilitated.

In the physical quantity sensor device 100 of the described configuration, a pressure medium is introduced from the pressure inlet 24 and when the diaphragm 11a of the pressure sensor chip 11 is subjected to pressure, the diaphragm 11a deforms, gauge resistor values on the diaphragm 11a vary, and a corresponding voltage signal is generated. The voltage signal is amplified by an amplifier circuit adjusted by an adjustment circuit such as a sensitivity compensating circuit, offset compensating circuit, temperature characteristics compensating circuit, etc., and the amplified voltage signal is output from the pressure sensor chip 11. The output signal is output via the bonding wire 14 to the first lead pins 15a.

Next, a method of manufacturing (method of assembling) the physical quantity sensor device 100 will be described. FIGS. 3A, 3B, 3C, 3D, 4, 5A, 5B, 6, 7, 8, 9, 10, 11, 12A, 12B, 12C, 12D, 13, 14, 15A, 15B, and 16 are diagrams depicting states of the physical quantity sensor device according to the first embodiment during manufacture (assembly).

First, the inner housing part 3 and the connector pins 31 to which the chip capacitors 18 are connected will be described with reference to FIGS. 3A to 5B. FIGS. 3A to 3D depict only the connector pins 31 and the chip capacitors 18 without the inner housing part 3.

Figure 3A:
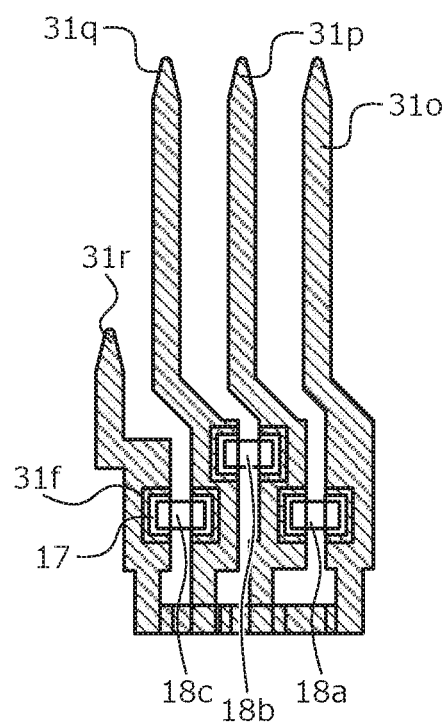
FIGS. 3A, 3B, 3C, 3D, 4, 5A, 5B, 6, 7, 8, 9, 10, 11, 12A, 12B, 12C, 12D, 13, 14, 15A, 15B, and 16 are diagrams depicting states of the physical quantity sensor device according to the first embodiment during manufacture (assembly)
Figure 3B:
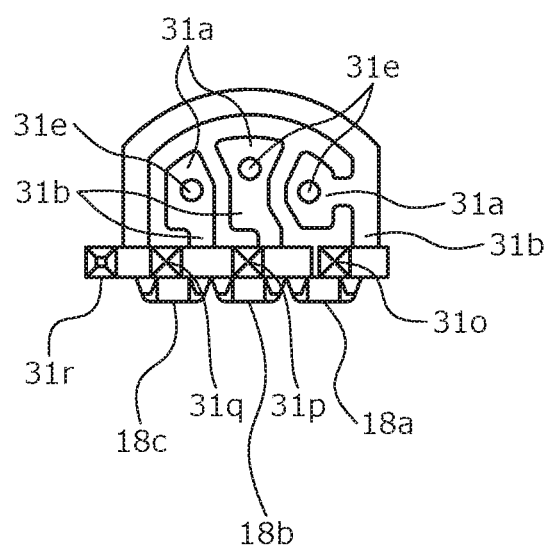
Figure 3C:
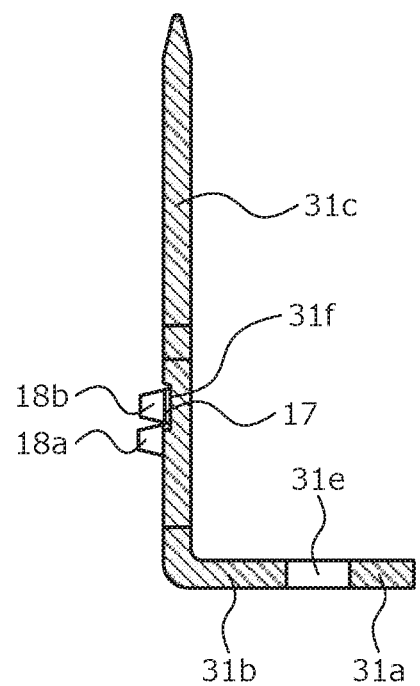
Figure 3D:
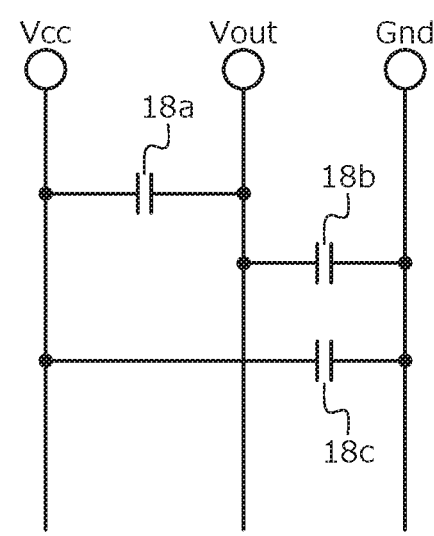

In FIGS. 3A to 3C, the connector pins 31 are depicted as viewed from various directions. FIG. 3D depicts an equivalent circuit of the chip capacitors 18 that connect the connector pins 31 to each other. A first connector pin 31o and a fourth connector pin 31r are signal terminal pins that supply a power-supply signal for supplying power-supply voltage, and are connected to a lead pin 15 that is a power supply terminal. A second connector pin 31p is a signal terminal pin for leading out a sensor signal, and is connected to a lead pin 15 that is an output terminal. A third connector pin 31q is a signal terminal pin for connecting to a ground (Gnd), and is connected to a lead pin 15 that is a ground terminal. Further, to install the chip capacitor 18 respectively between a signal terminal pin for supplying the power-supply signal (Vcc), the signal terminal pin for leading out the sensor signal (Vout), and the signal terminal pin for connecting to the ground (Gnd), two signal terminal pins for supplying the power-supply signal (Vcc) are provided on both sides like the first connector pin 31o and the fourth connector pin 31r.

The first connector pin 31o to the third connector pin 31q have a substantially L-shaped cross-sectional shape formed by a part (hereinafter, horizontal part (first part)) 31b embedded in the top 3a of the inner housing part 3 by resin molding and a part (hereinafter, vertical part) 31c continuous with and protruding upwardly orthogonal to the horizontal part 31b (the first connector pin 31o is shown in the example depicted in FIG. 3C). The fourth connector pin 31r has a substantially I-shaped cross-sectional shape having only the vertical part 31c (not depicted).

The first ends 31a of the first connector pin 31o to the third connector pin 31q are formed so as to surround the peripheries of the through-holes 31e (FIG. 3B). The first ends 31a of the first connector pin 31o to the third connector pin 31q may be formed in substantially semicircular planar shapes surrounding a portion of the peripheries of the through-holes 31e, or may have linear planar shapes reaching side walls of the through-holes 31e so as to be exposed at a part of the side walls of the through-holes 31e (not depicted).

The horizontal part 31b of the first connector pin 31o is provided so as to surround the first end 31a of the first connector pin 31o, the horizontal part 31b and the first end 31a of the second connector pin 31p, and the horizontal part 31b and the first end 31a of the third connector pin 31q, and is integrated with and connected to the fourth connector pin 31r (FIG. 3B). Thus, the first connector pin 31o and the fourth connector pin 31r have the same potential.

First, the chip capacitors 18 are attached to the connector pins 31 by the joining member 17, which is solder, a conductive adhesive, or the like. For example, the first connector pin 31o and the second connector pin 31p are connected via the chip capacitor 18a (FIGS. 3A and 3B). For example, the second connector pin 31p and the third connector pin 31q are connected via the chip capacitor 18b (FIGS. 3A and 3B). For example, the third connector pin 31q and the fourth connector pin 31r are connected via the chip capacitor 18c (FIGS. 3A and 3B). In this manner, the connector pins 31 are connected to each via the chip capacitors 18 (FIGS. 3A and 3B). As described, the first end 31a of the first connector pin 31o is connected to the vertical part 31c of the fourth connector pin 31r thereby enabling the chip capacitors 18 to be installed between the terminals (FIG. 3D).

In the example depicted in FIGS. 3A to 3D, although the chip capacitors 18 are installed between the terminals, configuration is not limited hereto. For example, whether a chip capacitor 18c between the fourth connector pin 31r and the third connector pin 31q is to be installed may be determined according to surge demands. For example, when the chip capacitor 18c is to be installed, electromagnetic compatibility (EMC) capability improves as compared to a case where the chip capacitor 18c is not installed.

Next, the connector pins 31 are placed in a mold for molding the inner housing part 3. Subsequently, a resin material is flowed into the mold whereby the inner housing part 3 and the connector pins 31 are integrally formed (insert molding).

Figure 4:
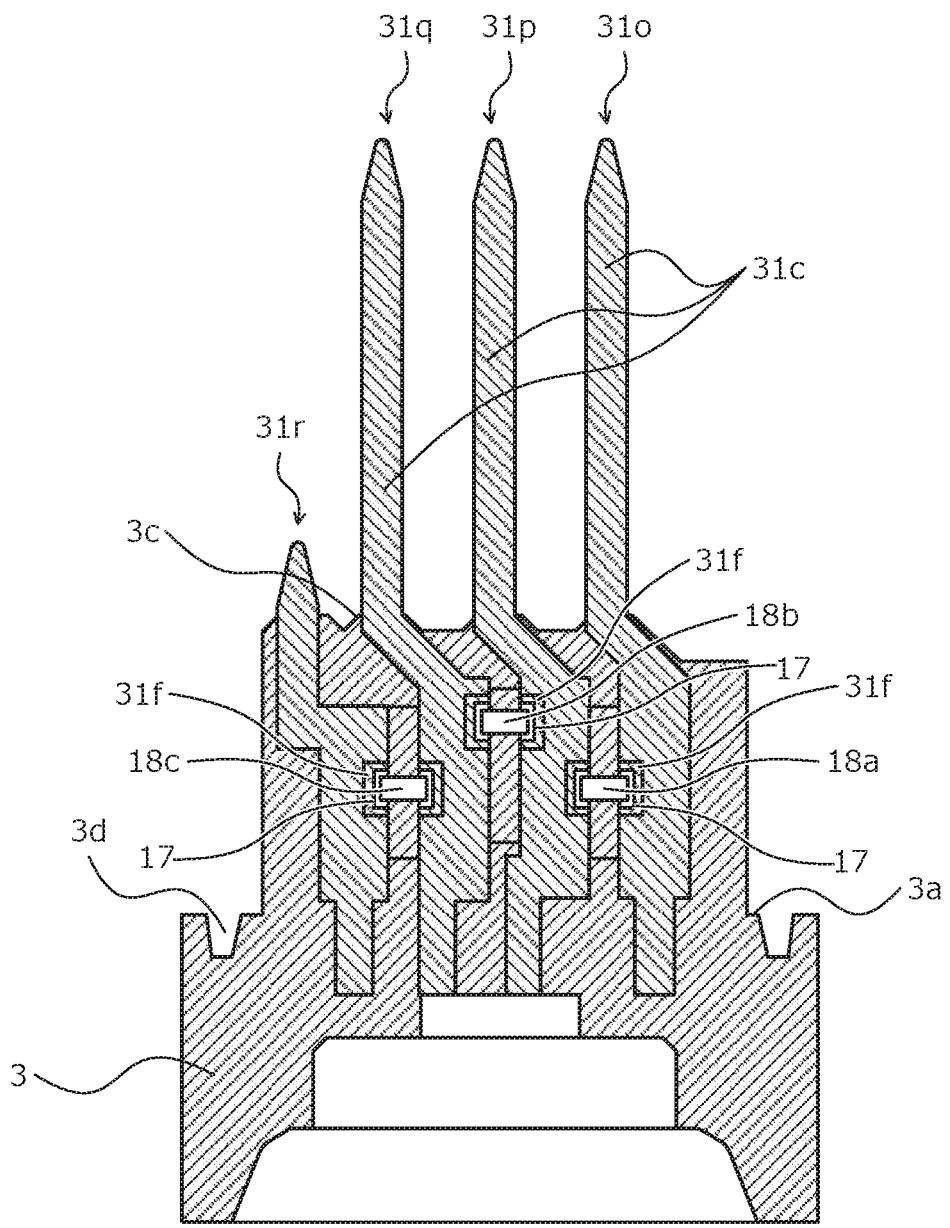
Figure 5A:
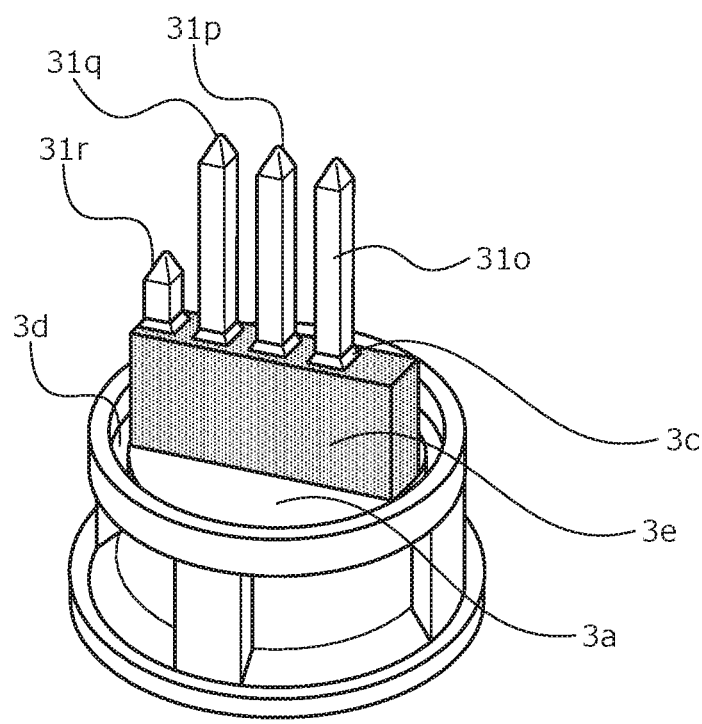
Figure 5B:
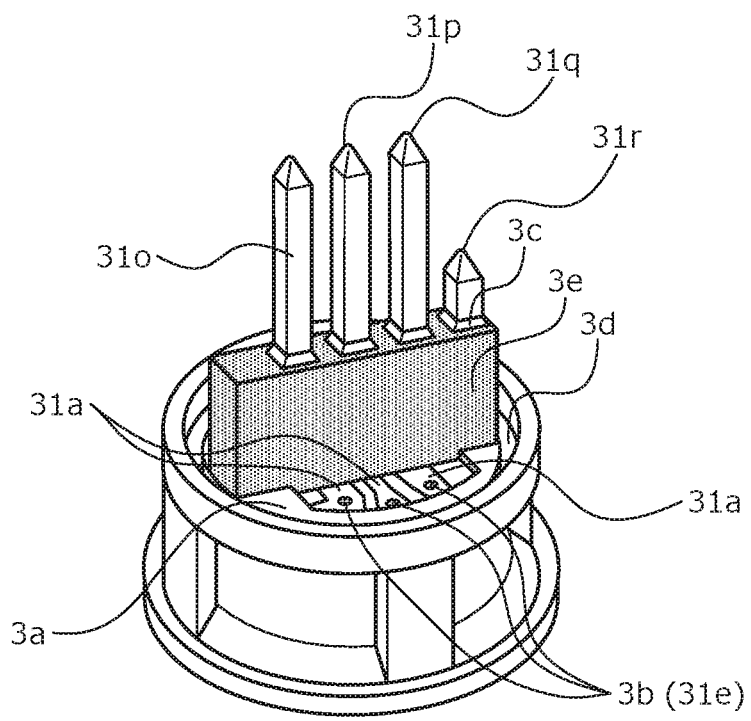

FIG. 4 is a cross-sectional view of the inner housing part 3. FIGS. 5A and 5B are exterior views of the inner housing part. The recess 3d that is fitted with the joining aspect that is joined with the socket housing part 4 is provided in the inner housing part 3 (FIG. 4, FIG. 5A, FIG. 5B).

Figure 12A:
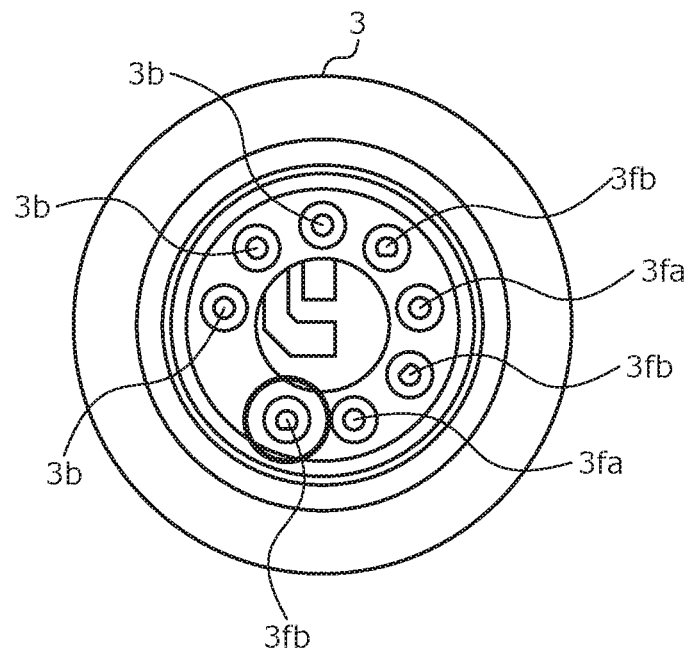
Figure 12B:
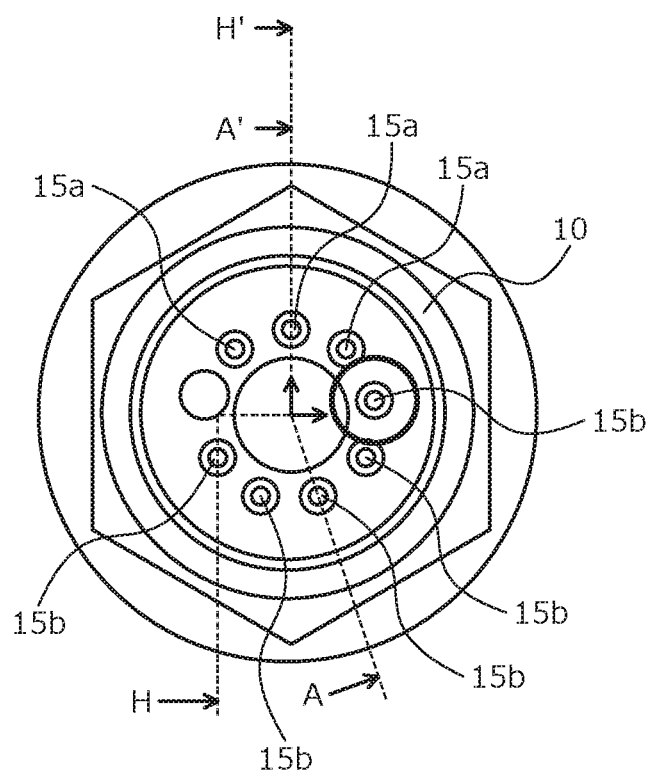

In the top 3a of the inner housing part 3, the through-holes 3b through which the first lead pins 15a penetrate are provided (FIG. 5B). The through-holes 3b are provided at the same positions as the positions of the through-holes 31e of the connector pins 31 (refer to FIGS. 3A to 3D). Therefore, the through-holes 3b of the surface seen from the side where the connector pins 31 of the inner housing part 3 are exposed are the same as the through-holes 31e. However, as depicted in FIGS. 12A and 12B described hereinafter, the through-holes 3b of the surface seen from the side where the connector pins 31 of the inner housing part 3 are exposed are through-holes formed by resin. Further, in the top 3a of the inner housing part 3, the connector pins 31 are integrally formed (FIG. 4, FIG. 5A, FIG. 5B). For example, a portion of the vertical part 31c of the connector pins 31 is exposed from the inner housing part 3 (FIG. 4). For example, the top 3a of the inner housing part 3 covers the horizontal part 31b of the connector pins 31. The first end 31a of the connector pins 31 is exposed from the top 3a of the inner housing part 3. These exposed portions of the first end 31a of the connector pins 31 and the first lead pins 15a are welded to each other.

Further, an upper end 3e of the inner housing part 3 covers the chip capacitors 18 attached to the connector pins 31 and the joining members 17.

Processes from a process of attaching the lead pins to the case 10 to a process of injecting the pressure medium and sealing will be described with reference to FIGS. 6 to 11.

Figure 6:
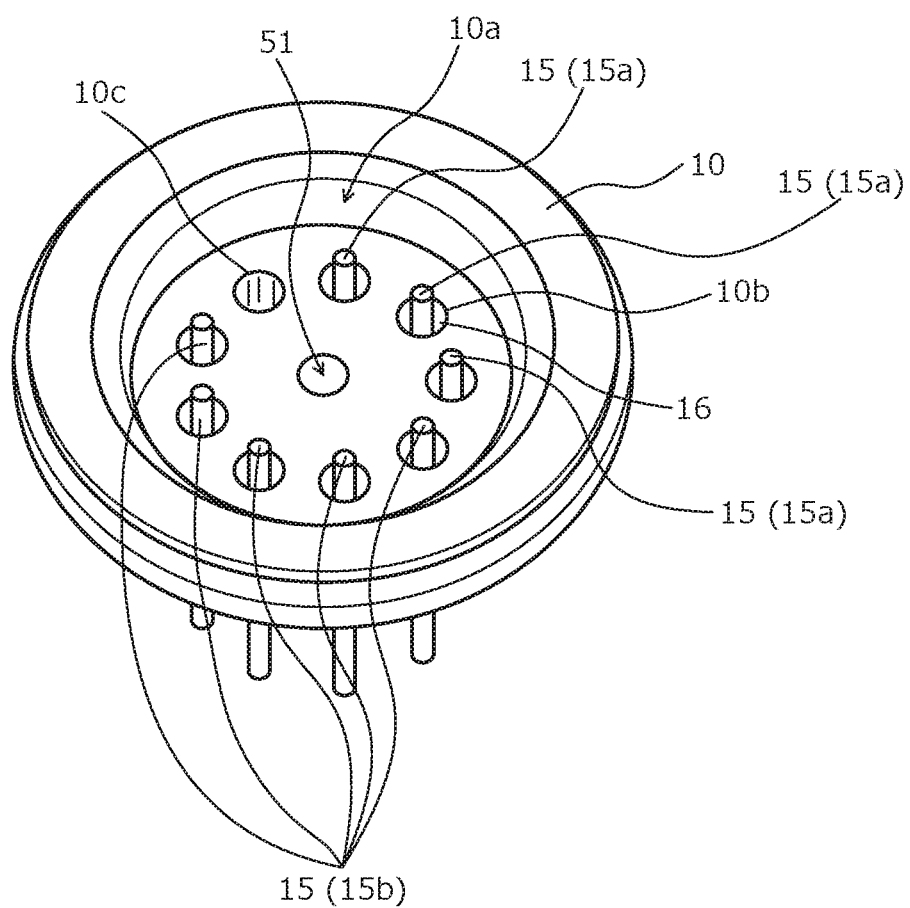

As depicted in FIG. 6, the lead pins 15 are placed in the through-holes 10b of the case 10. Here, an example will be described where the case 10 has a substantially circular planar shape and the through-holes 10b are provided along a circle centered about a center of the bottom of the recess 10a of the case 10. Among plural holes, one hole is a hole 10c for injecting an oil that is the pressure medium and the remaining holes are the through-holes 10b through which the lead pins 15 penetrate.

Figure 7:
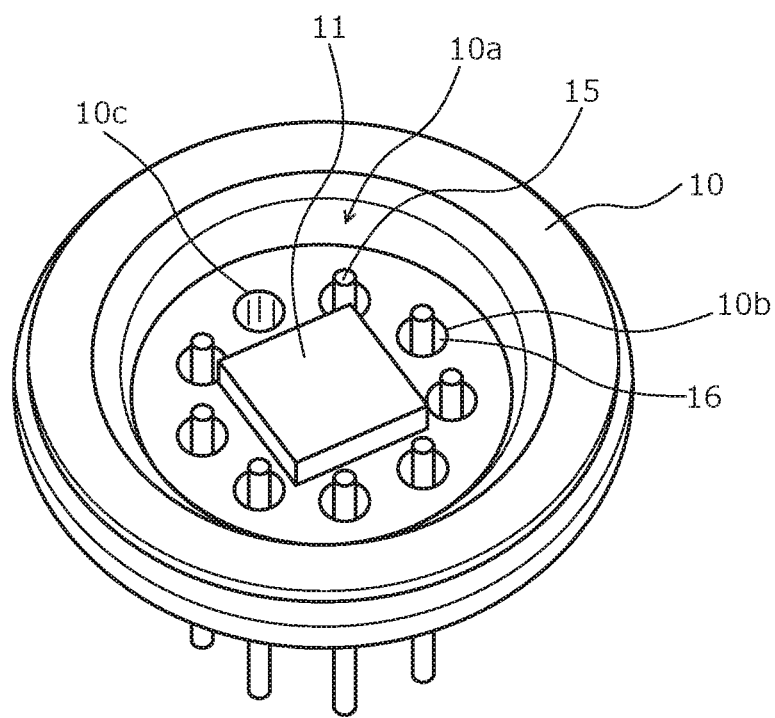
Figure 8:
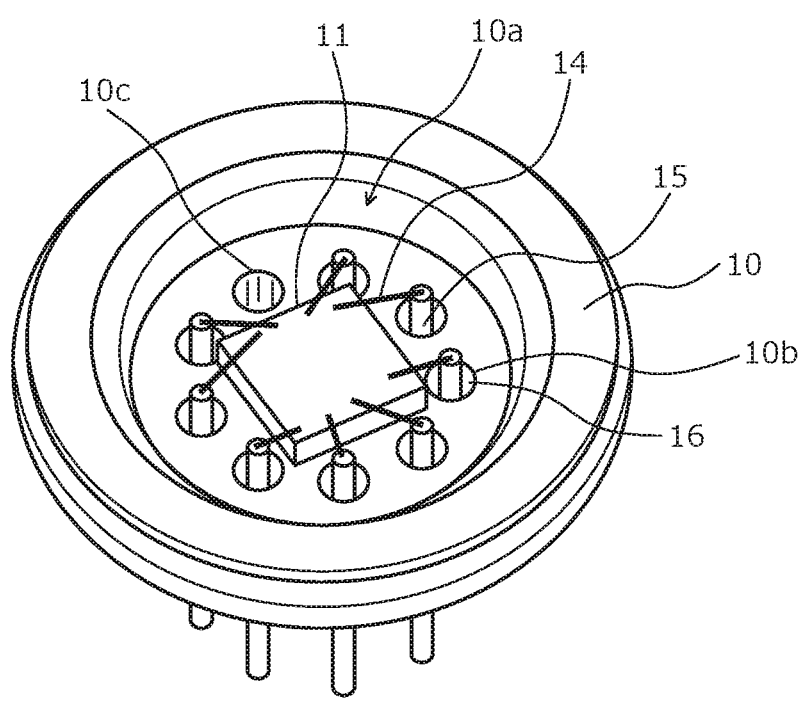
Figure 9:
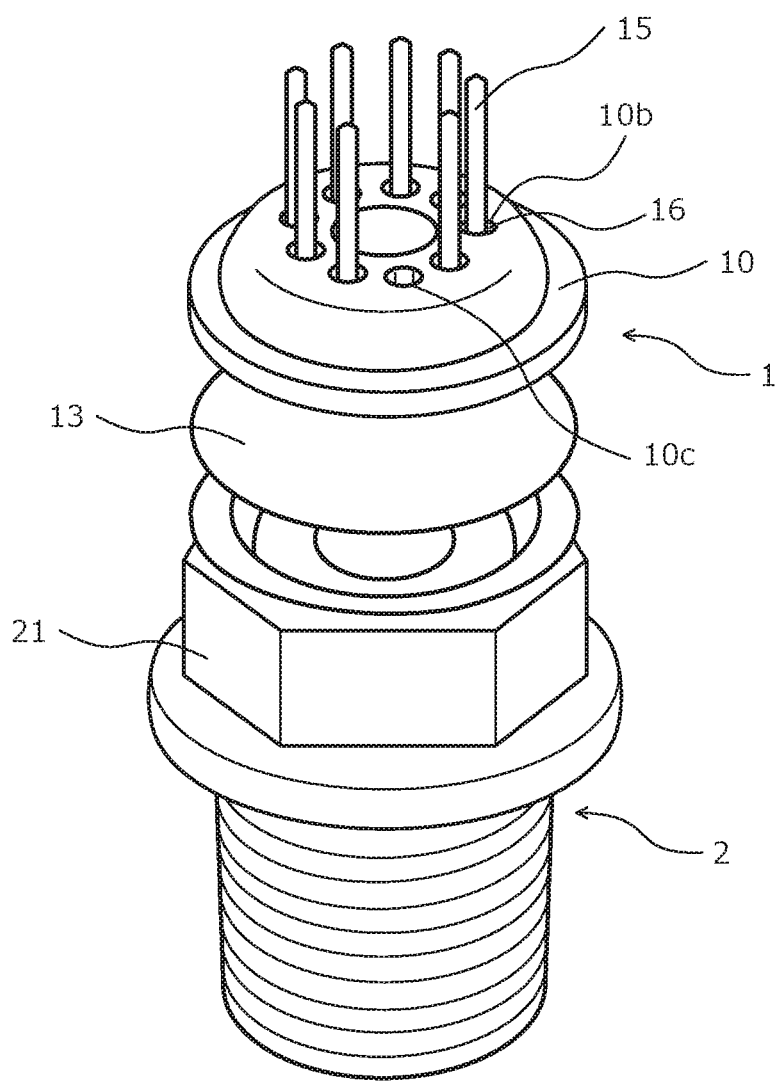

Next, the insulating material 16, which is glass or the like, is flowed into the through-holes 10b of the case 10, thereby joining (hermetic sealing) the lead pins 15 and the case 10. Next, an adhesive 51 is applied to the bottom of the recess 10a of the case 10, for example, at a center thereof where the through-holes 10b are not provided. Next, as depicted in FIG. 7, the pressure sensor chip 11 is placed on and mounted by the adhesive 51 of the bottom of the recess 10a of the case 10. Next, as depicted in FIG. 8, the lead pins 15 and the electrodes of the pressure sensor chip 11 are electrically connected by the bonding wire 14. Next, as depicted in FIG. 9, the case 10 is placed on the base 21 of the screw part 2 so that the diaphragm 13 is therebetween and the recess 10a side of the case 10 is downward (the screw part 2 side), and overlapping portions of these members, for example, are joined by laser welding.

Figure 10:
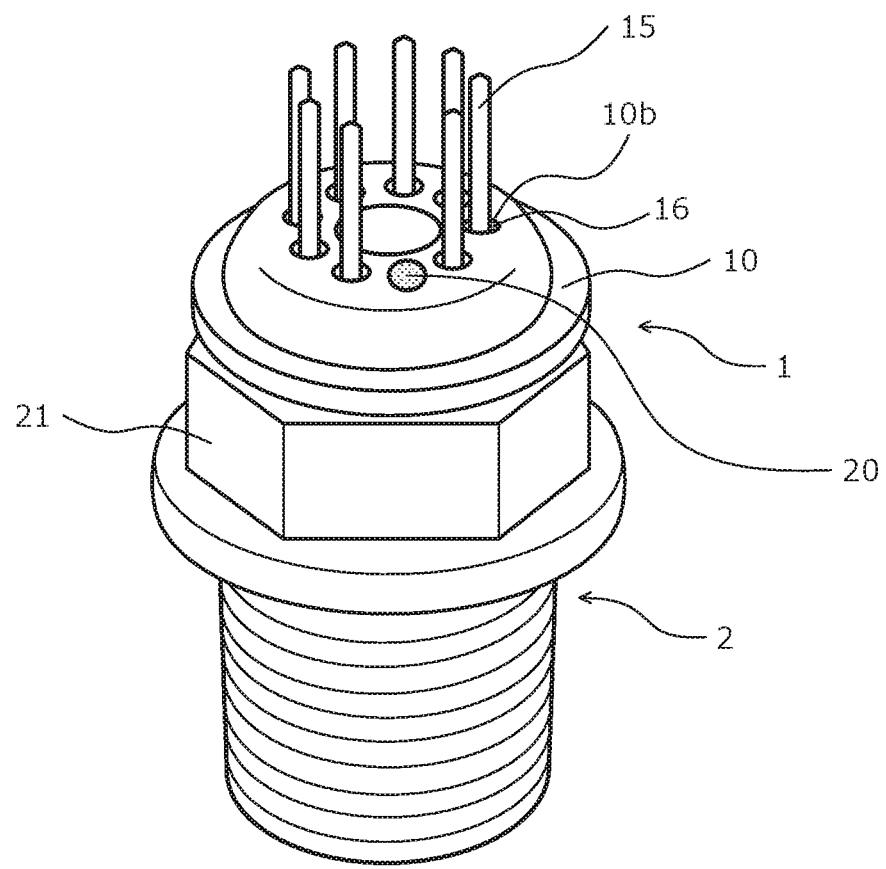
Figure 11:
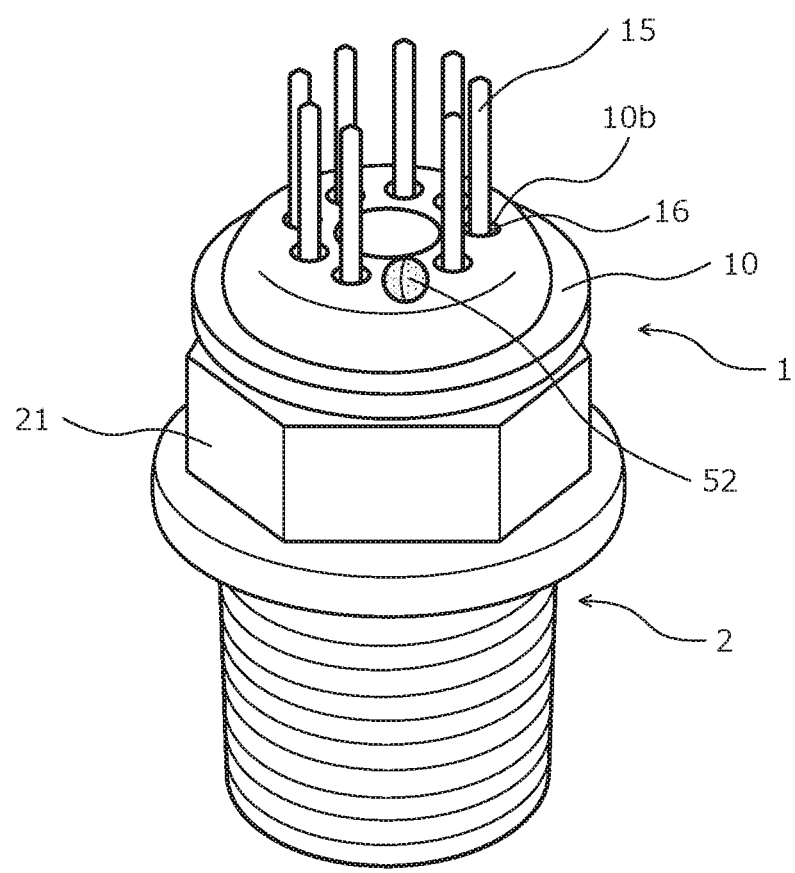

Next, as depicted in FIG. 10, in a vacuum atmosphere, a liquid 20 such as silicon oil is injected from the hole 10c of the case 10 into the space surrounded by the recess 10a of the case 10 and the diaphragm 13. Next, as depicted in FIG. 11, for example, a metal ball 52 made of a metal such as SUS is pressed into the hole 10c through which the liquid 20 was injected, and voltage is applied. As a result, the metal ball 52 is welded (resistance welded) in the opening of the hole 10c whereby the liquid 20 is sealed in. Next, by an ordinary method, property adjustment/trimming for the sensor element 1 is performed.

A process of adhering the inner housing part 3 and the case 10 will be described with reference to FIGS. 12A to 14.

FIG. 12A depicts the bottom of the inner housing part 3, on the side where the connector pins 31 are not exposed and FIG. 12B depicts an aspect where the lead pins 15 of the case 10 are exposed.

In the example depicted in FIG. 12A, the inner housing part 3 has three through-holes 3b and five holes or grooves 3f. The through-holes 3b, as described above, are connected to the connector pins 31. The first lead pins 15a penetrate the through-holes 3b and are connected to the connector pins 31. The grooves 3f include first grooves 3fa and second grooves 3fb. The first grooves 3fa and second grooves 3fb may be holes that do not extend through the inner housing part 3. The second lead pins 15b are fitted into the grooves 3f. When a length of the lead pins 15 is about 8 mm, the fitted length of the grooves 3f and the second lead pins 15b is about 2 mm to 3 mm. As shown in FIG. 12A, the groove 3fb includes a first end rim 3g and an inner rim 3h defining the portion of the groove 3fb in which the second lead pins 15b are fitted. Likewise, as shown in FIG. 12B, the through-holes 3b include a first end rim 3i and a second end rim 3j, such that the though-holes 3b have, in a side cross-sectional view, a frustoconical shape (see, for example, FIG. 1).

Since the cross-sectional shape of the lead pins 15 in the horizontal direction (cross-section resembling round slices of the lead pins 15) is a circular shape, the shapes of the through-hole 3b and the first grooves 3fa are circular. A diameter of the through-hole 3b and the first groove 3fa is øh. A diameter of the lead pins 15 is øp, where øp=øh, or in other words, where øp equals øh, or øp is greater than øh.

Figure 12C:
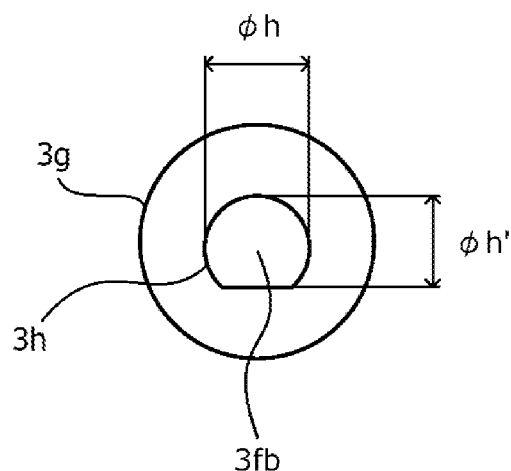
Figure 12D:
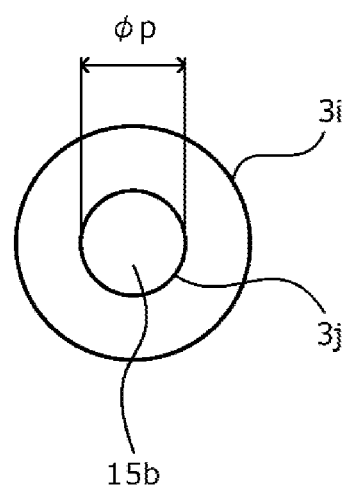

The shape of the second groove 3fb is shaped such that a distance between opposing sides of the second grooves 3fb in at least one direction of the second groove 3fb, as seen in a cross-section, is shorter than the length of øp to an extent that the second lead pins 15b may be deformed to fit in the second grooves 3fb by pushing the second lead pins 15b into the second grooves 3fb. Further, the shape of the second grooves 3fb is shaped so that the limit of the force for pushing the second lead pins 15b is not exceeded, or in other words, a strength of the material of the second lead pins 15b and a number of the second lead pins 15b is taken into account to account for a size of the second grooves 3fb. In the example depicted in FIG. 12A, the shape of the second grooves 3fb is a shape that combines a chord-shape and an arc-shape. The shape of the second grooves 3fb may alternatively be another polygonal shape such as a substantially hexagonal shape, a substantially rectangular shape, etc. In other words, embodiments of the invention encompass any shape of a second groove 3fb, such that the second lead pins 15b may be pushed into the second grooves 3fb to fit into the second grooves 3fb when the diameter of the second grooves is smaller than a diameter of the second lead pins 15b. For example, as shown in FIG. 12C, the distance of the chord portion of the second grooves 3fb is øh', where øh'<øp. For example, with consideration of variation in the dimensional accuracy of the second grooves 3fb and the second lead pins 15b, øh' may be between 5% to 10% less than øp. Embodiments of the invention are not limited to a diameter øh' between 5% to 10% less than øp. Instead, embodiments encompass a diameter øh' around 5% to 10% less than øp, such as between 3% to 13% of øp. Embodiment of the invention encompass any diameter øh' of a second groove 3fb smaller than a diameter øp of second lead pins 15b that allow the second lead pins 15b to be inserted into the second grooves 3fb by being deformed or scraped upon being pushed into the second grooves 3fb. Alternatively, the second grooves 3fb may be deformed upon insertion of the second lead pins 15b into the second grooves 3fb to allow the second lead pins 15b to be inserted to the second grooves 3fb and securely held by the second grooves 15b. Alternatively, both the second lead pins 15b and the second grooves 3fb may be deformed upon insertion of the second lead pins 15b into the second grooves 3fb to allow the second lead pins 15b to be inserted to the second grooves 3fb and securely held by the second grooves 15b. The second lead pins 15b are scraped when fitted in the second grooves 3fb and therefore, when øh'=øp there is a possibility that the second lead pins 15b may not fit precisely. Therefore, embodiments encompass a configuration such that øh'<øp.

Further, when there is a large number of the second grooves 3fb, the force for pushing the second lead pins 15b in the second grooves 3*fb* increases whereby with a large number of second lead pins 15*b*, it may be impossible to push the second lead pins 15*b* into the second grooves 3*fb*. Thus, the number of the second grooves 3*fb* may be one to three, where two second grooves 3*fb* are preferable to one and three second grooves 3*fb* are preferable to two. When the number of the second grooves 3*fb* is three, the surface becomes fixed, thereby suppressing undesired lifting of the inner housing part. Further, while the shape of the grooves 3*f* may be configured to be that of the second grooves 3*fb*, the shape of the through-holes 3*b* may be the shape of the second grooves 3*fb*. For example, when all five of the second lead pins 15*b* are cut, the second lead pins 15*b* do not fit in the grooves 3*f* and therefore, among the three through-holes 3*b*, the shape of at least one of the through-holes 3*b* may be the shape of the second grooves 3*fb*. Further, for example, while the number of the second grooves 3*fb* according to one embodiment is three (among the five second lead pins 15*b*), when three of the second lead pins 15*b* are cut and only two of the second lead pins 15*b* do not fit in the grooves 3*f*, among the three through-holes 3*b*, the shape of one of the through-holes 3*b* may be configured to be the shape of the second grooves 3*fb*.

In this manner, for example, among the grooves 3*f*, by changing the shape of some of the grooves 3*f* from a circular shape to a shape where the distance between opposing sides is shorter than the diameter of the circular shape, the lead pins 15 have a structure that fits in the grooves 3*f*. Therefore, lifting of the inner housing part 3 at during curing of the adhesive 28 (FIG. 1) may be suppressed. On other words, when the adhesive 28 is cured, the formation of a gap between the bottom 3*c* of the inner housing part 3 and the case 10 may be suppressed.

Figure 13:
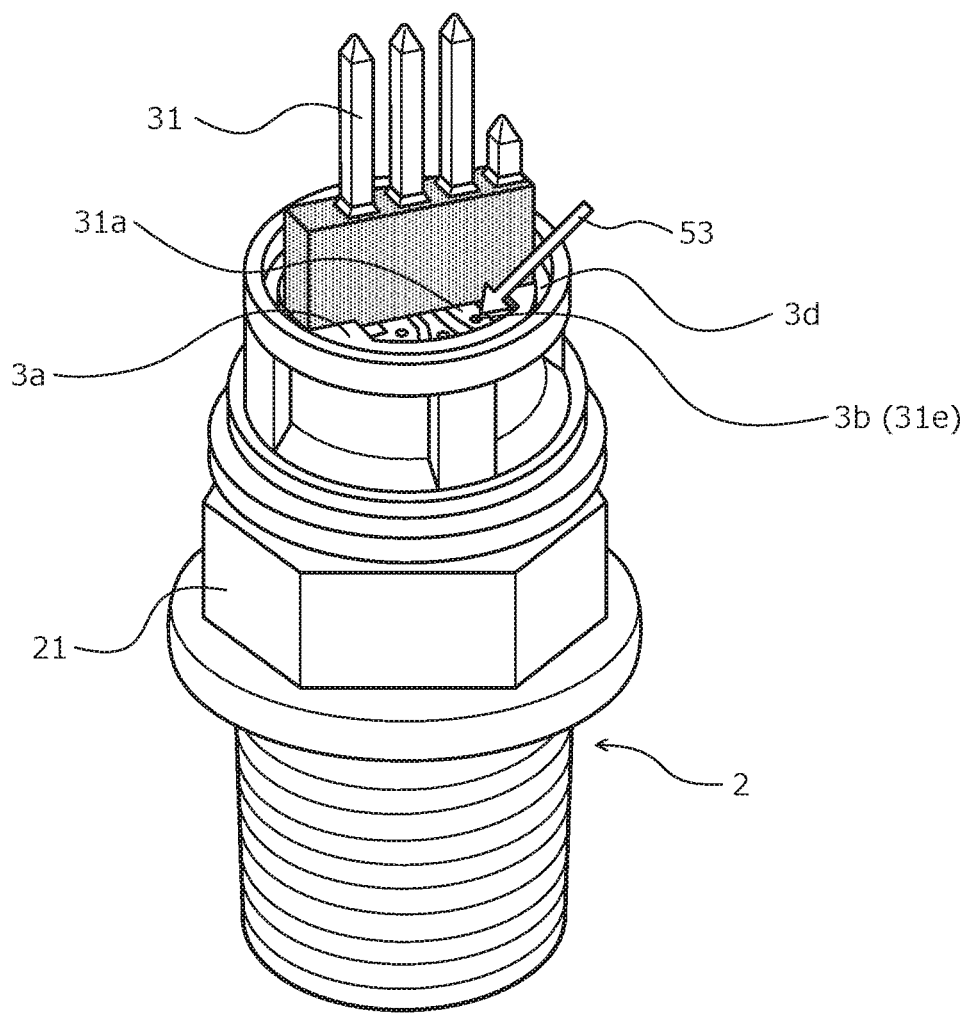

Next, as depicted in FIG. 13, the first lead pins 15*a* penetrate the through-holes 3*b* of the inner housing part 3 integrally formed with the connector pins 31 and the second lead pins 15*b* are fitted in the grooves 3*f* of the inner housing part 3 whereby the position of the inner housing part 3 is determined, and the inner housing part 3 is fixed to the case 10 by the adhesive 28 that has been cured (FIG. 1). For example, the inner housing part 3 and the case 10 are maintained in a high temperature state until the applied adhesive 28 is cured. Here, since the second lead pins 15*b* are fitted in the grooves 3*f* of the inner housing part 3, lifting of the inner housing part 3 during curing of the adhesive 28 may be prevented, and the inner housing part 3 and the case 10 need not be pressed against each other. In this manner, assembly may be performed simply.

At this time, the first lead pins 15*a* are in contact with the connector pins 31 exposed on the top 3*a* of the inner housing part 3 by the through-holes 3*b* of the inner housing part 3. Further, at this step, the socket housing part 4 that covers the periphery of the connector pins 31 is not joined, and on the inner housing part 3, no members forming obstacles on an approach path of laser light 53 are arranged. In other words, contacting parts of the upper end of the first lead pins 15*a* and the first end 31*a* of the connector pins 31 are visible from substantially above. Next, the laser light 53 is irradiated at a predetermined angle of incidence in the through-holes 3*b* of the inner housing part 3 whereby contacting parts of the upper ends of the first lead pins 15*a* and the first ends 31*a* of the connector pins 31 are welded (joined).

Figure 14:
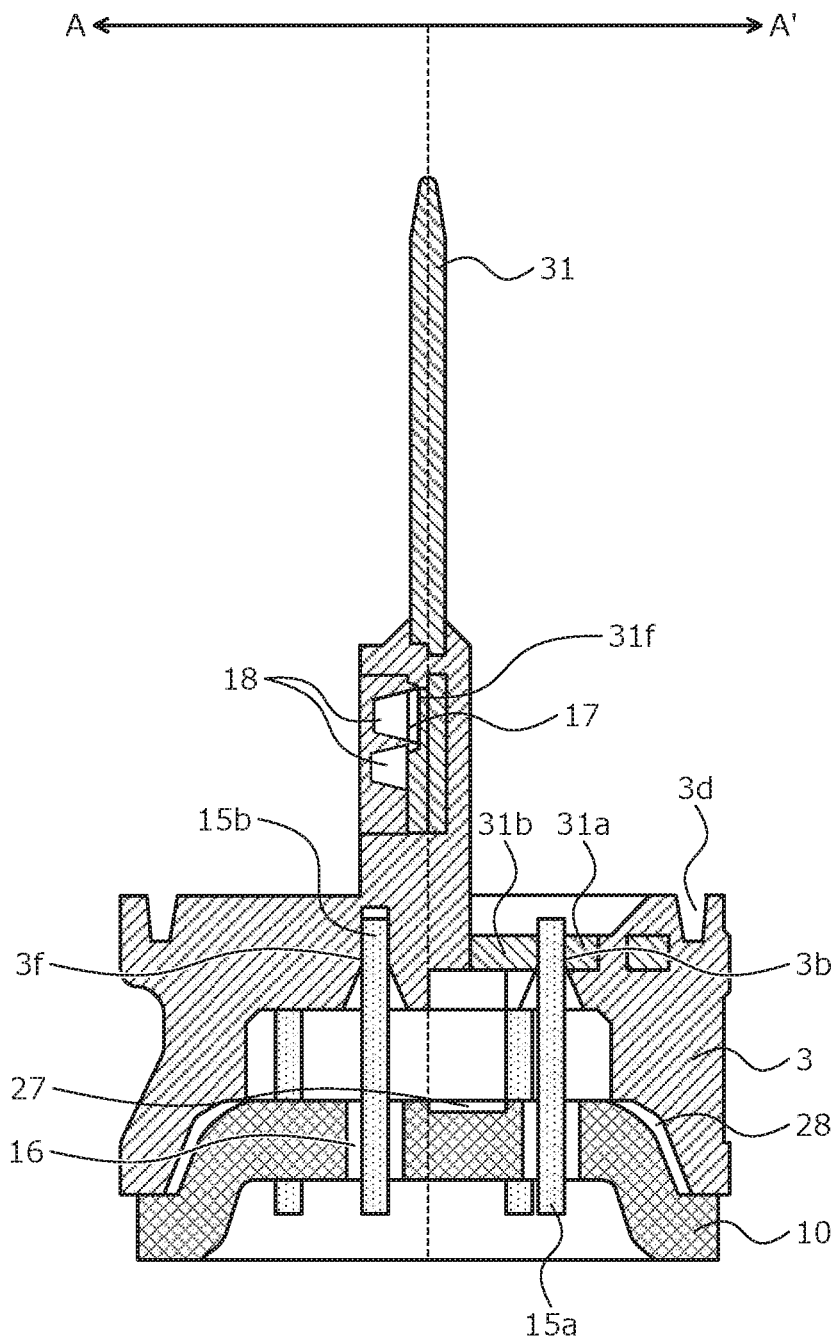

FIG. 14 is a cross-sectional view of the fixed inner housing part 3 and the case 10, at a position of a cross-section A-A' depicted in FIG. 12B. In FIG. 14, the screw part 2 and the pressure sensor chip 11 are not depicted. The first lead pins 15*a* are welded to the connector pins 31. In particular, for example, the upper ends of the first lead pins 15*a* penetrate the through-holes 3*b*, and are joined to the first ends 31*a* of the connector pins 31 and the horizontal parts 31*b* of the connector pins 31. Meanwhile, the second lead pins 15*b* the grooves 3*f* are fitted with each other. Further, since the second lead pins 15*b* are not cut, the second lead pins 15*b* and the first lead pins 15*a* are the same length. The socket housing part 4 will be described with reference to FIGS. 15A and 15B.

Figure 15A:
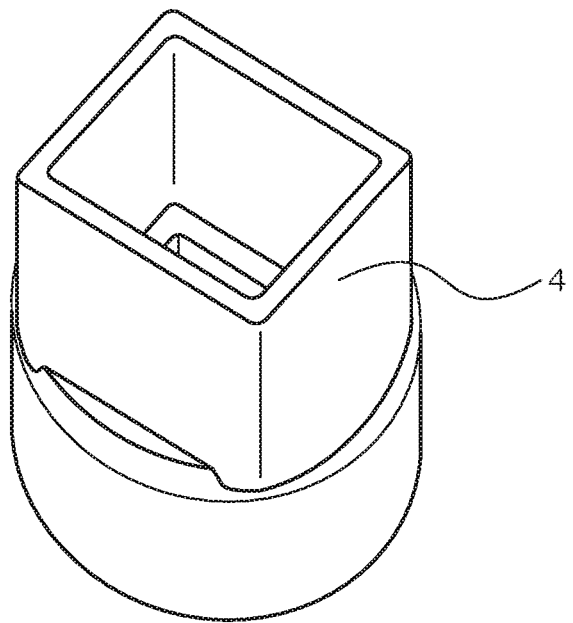
Figure 15B:
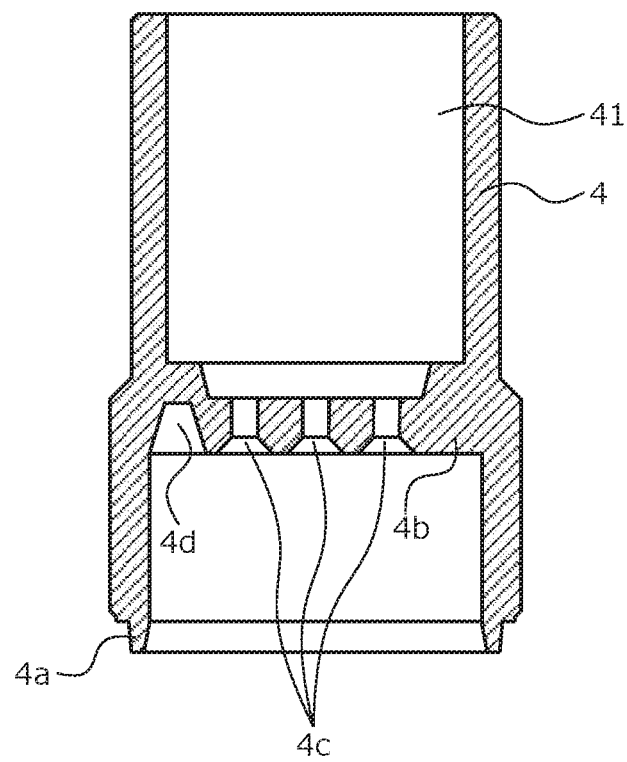

FIG. 15A is a perspective drawing of the socket housing part 4. FIG. 15B is a cross-sectional view of the socket housing part 4. The socket housing part 4 houses the vertical part 31*c* of the connector pins 31. The socket housing part 4, at an aspect joined with the inner housing part 3, is provided with the protrusion 4*a* that is fitted with the recess 3*d* of the inner housing part 3.

Further, the inside of the socket housing part 4 is a recess. At the bottom 4*b* of the recess of the socket housing part 4, the through-holes 4*c* and a groove 4*d* are provided. At the bottom 4*b*, the groove 4*d* is provided at a portion near an inner wall of the socket housing part 4 whereby a thickness of a part where the groove 4*d* of the bottom 4*b* is provided is thicker than the through-holes 4*c*. The first connector pin 31*o* to the third connector pin 31*q* penetrate the through-holes 4*c*. The fourth connector pin 31*r* is inserted into the groove 4*d*. Further, the through-holes 4*c* and the groove 4*d*, including a bottom 3*c* of the inner housing part 3, have a shape that enables the connector pins 31 to penetrate or be inserted. The position of the inner housing part 3 may be determined by the position of the groove 4*d* and the through-holes 4*c*.

A process of joining the socket housing part 4 and the inner housing part 3 will be described with reference to FIG. 16.

Figure 16:
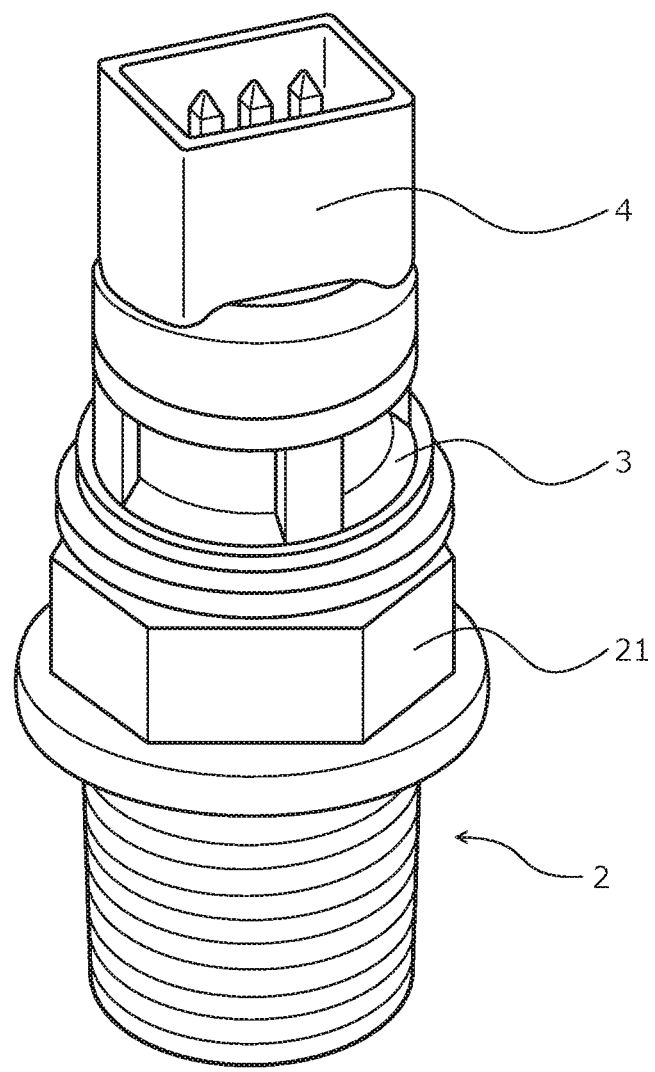

As depicted in FIG. 16, the socket housing part 4 and the inner housing part 3 are joined by an adhesive. As a result, the socket housing part 4 is joined on the top 3*a* of the inner housing part 3 so as to surround a periphery of the connector pins 31. At this time, for example, the first connector pin 31*o* to the third connector pin 31*q* penetrate the through-holes 4*c*. The fourth connector pin 31*r* is inserted into the groove 4*d* and the first connector pin 31*o* to the third connector pin 31*q* penetrate the through-holes 4*c* whereby the inner housing part 3 and the socket housing part 4 are joined to each other.

Thereafter, an O-ring 26 is disposed beneath the base 21 of the screw part 2 (FIG. 1) whereby the physical quantity sensor device 100 depicted in FIG. 1 is completed.

As described, according to the first embodiment, the shape of some holes of the inner housing part housing the lead pins is such that the distance between opposing sides of each hole is shorter than the diameter of the lead pin housed in the hole. As a result, these holes and the lead pins fit together whereby a gap occurring from the lifting of the inner housing part from the sensor element during curing for fixing the sensor element having the lead pins and the inner housing part by a thermoset adhesive may be prevented. As a result, adhesion of the sensor element and the inner housing part may be stabilized, enabling simple assembly without performing a process for pressing the sensor element and the inner housing part against each other during curing. Thus, improvement of the adhesive strength and strength stabilization may be facilitated, and manufacturing variation of the physical quantity sensor device may be suppressed.

Further, while lead pins such as an output terminal, a power supply terminal, a ground terminal, etc. for inputting and outputting signals with respect to an external device are laser welded to the connector pins of the inner housing part, when the lead pins are scratched, the laser welding is difficult. Therefore, according to the first embodiment, the lead pins that are housed in holes whose shape is changed are lead pins for performing property adjustment/trimming of the sensor and are not used during actual operation of the physical quantity sensor device. As a result, the adhesion of the sensor element and the inner housing part may be stabilized without scraping the lead pins such as an output terminal, a power supply terminal, a ground terminal, etc. for inputting and outputting signals with respect to an external device.

Further, the number of holes whose shape is changed may be one to three. As a result, fitting ease is maintained and the lifting of the inner housing part from the sensor element may be suppressed. In particular, when the number of holes whose shape is changed is three, the surface is fixed whereby lifting of the inner housing part from the sensor element is further suppressed. Further, for example, when the cross-sectional shape of the connector pins is a circular shape, the shape of the remaining holes of the socket housing part excluding those whose shape is changed is a circular shape, and the shape of the holes whose shape is changed is a shape that is a combination of a chord-shape and an arc-shape.

Figure 17:
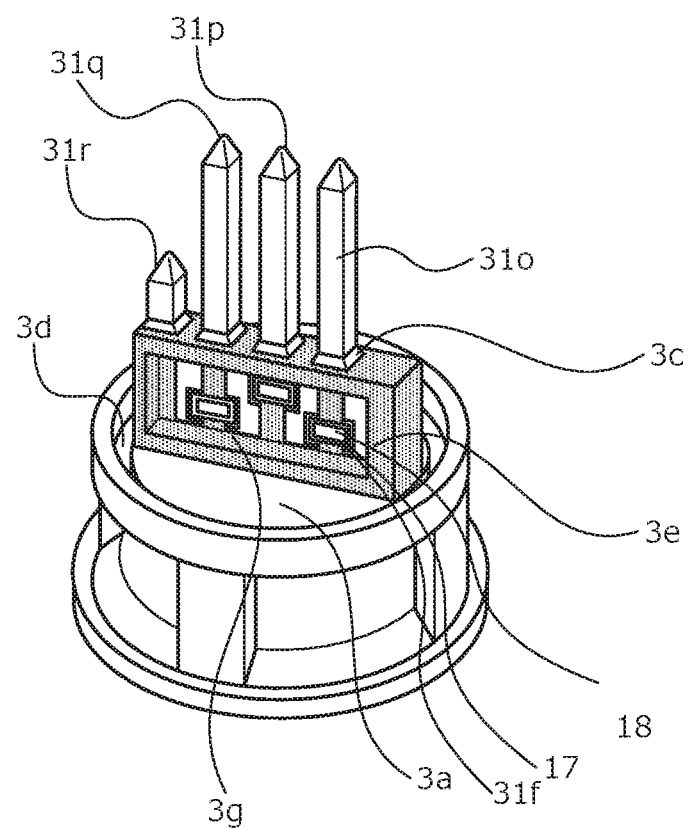
FIG. 17 is a diagram depicting the physical quantity sensor device during manufacture (assembly) according to a second embodiment.

The method of manufacturing a physical quantity sensor device according to the second embodiment will be described. FIG. 17 is a diagram depicting the physical quantity sensor device during manufacture (assembly) according to the second embodiment. The method of manufacturing a physical quantity sensor device according to the second embodiment differs from the method of manufacturing a physical quantity sensor device according to the first embodiment in that the inner housing part 3 and the connector pins 31 are integrally formed so as to form a window 3g exposing a portion of the connector pins 31 for attaching the chip capacitors 18 and after the chip capacitors 18 are attached to the connector pins 31 exposed in the window 3g of the inner housing part 3, the window 3g is filled with a resin.

In particular, the connector pins 31 are placed in a mold for forming the inner housing part 3. Subsequently, a resin material is flowed into the mold whereby the inner housing part 3 and the connector pins 31 are integrally formed. Thus, as depicted in FIG. 17, the upper end 3e of the inner housing part 3 where the window 3g is provided is formed. Next, as depicted in FIG. 17, the chip capacitors 18 are attached by the joining members 17 to the recesses 31f of the connector pins 31 exposed in the window 3g. Next, resin material is flowed into the window 3g whereby the window 3g is filled with a resin. As a result, as depicted in FIG. 5A described above, the inner housing part 3 in which the joining member 17 and the chip capacitor 18 attached to the connector pins 31 are covered by a resin is obtained.

The process of integrally forming the inner housing part 3 and the connector pins 31, the process of attaching the chip capacitors 18 to the connector pins 31, and the process of filling the window 3g with a resin in the method of manufacturing a physical quantity sensor device according to the second embodiment are performed in place of the process for attaching the chip capacitors 18 to the connector pins 31 and integrally forming the inner housing part 3 and the connector pins 31 after attaching the chip capacitors 18 in the method of manufacturing a physical quantity sensor device according to the first embodiment. Further, in the method of manufacturing a physical quantity sensor device according to the second embodiment, processes other than these processes are similar to those in the method of manufacturing a physical quantity sensor device according to the first embodiment and therefore, detailed description is omitted hereinafter.

The present invention is not limited to the described first and second embodiments, and may be variously modified within a scope not deviating from the spirit of the invention. For example, in the described embodiments, while a pressure sensor device has been described as an example, without limitation to the described embodiments, for example, the invention is further applicable to a physical quantity sensor device that detects a physical quantity other than pressure such as acceleration, gyro (angle, angular velocity), flow, temperature, etc. Further, in the above embodiments, while a strain gauge type pressure sensor chip has been described as an example, the present invention is further applicable to a semiconductor piezoresistor type, an electrostatic capacitance type, and a silicon resonant type pressure sensor chip.

Further, for example, in the first and second embodiments, although description has been given using an example in which a chip capacitor is provided at an end of the connector pins of the inner housing part, a chip capacitor for noise suppression may be provided via a noise suppressing substrate in a recess of the inner housing part. The noise suppressing substrate, for example, may have through-holes for at least a portion of the first lead pins and the second lead pins to penetrate. The first lead pins are soldered to a land (not depicted) provided around the through-holes. The noise suppressing substrate is fixed to the first lead pins that penetrate the through-holes and arrangement (the vertical direction and the horizontal direction) with respect to the case is determined. Further, at least some of the second lead pins may penetrate the through-holes of the noise suppressing substrate whereby the noise suppressing substrate is fixed by these second lead pins. In this case, a land need not be provided around the through-holes through which the second lead pins penetrate. The second lead pins that penetrate the through-holes, for example, may be three second lead pins.

Further, the chip capacitor is arranged on the upper face (face on the side opposite the side that faces the case in the vertical direction) of the noise suppressing substrate and is electrically connected to the first lead pins via a wiring pattern and a land. Further, the upper end of the second lead pins that do not penetrate through-holes of the noise suppressing substrate may be cut to a length that may be housed in the recess of the inner housing part, after property adjustment/trimming.

Further, for example, in the first and second embodiments, an example is described that uses two members: the inner housing part and the socket housing part. In a case where the first lead pins and the connector pins are laser welded, this configuration facilitates welding by performing the laser welding for the first lead pins and the connector pins before attaching the socket housing part. However, in a case where the physical quantity sensor device is sufficiently large and the laser welding of the first lead pins and the connector pins may be performed after the socket housing part is attached, and the inner housing part and the socket housing part may be integrated by resin molding. In this case, when the inner housing part and the socket housing part are integrally formed, connector pins to which the chip capacitors are attached may be formed by insert molding. In the method of manufacturing a physical quantity sensor device having a housing part (first housing part) in which the inner housing part and the socket housing part are integrally formed, the connector pins to which the chip capacitors are attached by the joining member are placed in a mold for forming the housing part and a resin material is flowed into the mold whereby the connector pins and the housing part that combines the inner housing part and the socket housing part may be integrally formed.

According to the present invention, the lifting of two members is suppressed and the physical quantity sensor device may be assembled easily.

As described, the method of manufacturing a physical quantity sensor device and the physical quantity sensor device according to the present invention are useful for a physical quantity sensor device having a sensor chip to which pressure is applied from the recess side (diaphragm side) of the case and are particularly suitably for a pressure sensor device.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of manufacturing a physical quantity sensor device, the method comprising:
    preparing a measured-medium intake part, first terminals, a sensor element, and a first housing part for sandwiching the sensor element with the measured-medium intake part, wherein
    the measured-medium intake part has an intake hole that guides a measured medium is one of a gas subject to measurement and a liquid subject to measurement,
    the sensor element is fixed on a base so as to cover the intake hole, the base being provided at one end of the intake hole of the measured-medium intake part,
    each of the first terminals has a protruding portion protruding from the sensor element toward a side opposite to a side in which the measured-medium intake part is to be disposed, the first terminals including a third terminal and a fourth terminal, and
    the first housing part has a first hole and a second hole, the first housing part having therein a second terminal for connecting the sensor element to external wiring,
    the method further comprising:
    inserting the fourth terminal into the first hole of the first housing part to connect the sensor element to the first housing part, and inserting the third terminal into the second hole of the first housing part to connect the sensor element to the second terminal;
    applying an adhesive between the sensor element and the first housing part, and curing the adhesive to fix the first housing part to the sensor element; and
    adjusting or trimming the sensor element using the fourth terminal,
    wherein the first hole has a cross-sectional shape in which a distance between opposing sides of a cross section of the first hole is less than a diameter of the fourth terminal to be housed in the first hole, for suppressing lifting the first housing part from the sensor element during a process of curing the adhesive, such that adhesion of the sensor element and the first housing part is stabilized.

2. The method according to claim 1, wherein the first hole is disposed in plurality in the first housing part, a number of first holes being in a range from two to three.

3. The method according to claim 1, wherein the first housing part includes three first holes.

4. The method according to claim 1, wherein
    the sensor element includes a sensor chip that includes a sensor and a control circuit electrically connected to the sensor,
    the third terminal is inserted into the second hole for electrically connecting the control circuit and the second terminal, and
    the fourth terminal is prepared in plurality, and the first hole is disposed in plurality, each fourth terminal being inserted into a corresponding one of the first holes.

5. The method according to claim 1, wherein
    the sensor element includes a sensor chip that includes a sensor and a control circuit electrically connected to the sensor,
    the third terminal is prepared in plurality, and the second hole is a through-hole and is disposed in plurality in the first housing part, each third terminal being inserted into a corresponding one of the second holes for electrically connecting the control circuit and the second terminal,
    the fourth terminal is prepared in plurality, and the first hole is a groove and is disposed in plurality in the first housing part, each fourth terminals being inserted into one of a corresponding second holes, and
    the second terminal has a first part to which said each third terminal is to be electrically connected.

6. The method according to claim 1, wherein
    the first housing part is constituted by:
    a second housing part for sandwiching the sensor element with the measured-medium intake part and for housing the first terminals, and a part of the second terminal; and
    a third housing part for sandwiching the second housing part with the sensor element and housing the rest of the second terminal.

7. The method according to claim 1, wherein the first housing part is made of a resin.

8. The method according to claim 1, wherein
    the sensor element includes the sensor chip and a case, and
    the case is made of a metal and is fixed on the base.

9. The method according to claim 1, wherein
    inserting the fourth terminal into the first hole of the first housing includes inserting the fourth terminals into the first hole by deforming the fourth terminal so as to fit the first hole.

10. The method according to claim 1, wherein each of the first terminals has the same length.

11. A physical quantity sensor device comprising:
    a measured-medium intake part having an intake hole that guides a measured medium that is one of a gas subject to measurement and a liquid subject to measurement, the measured-medium intake part having a base provided at one end of the intake hole;
    a sensor element fixed on the base so as to cover the intake hole;
    first terminals each having a protruding portion protruding from the sensor element toward a side opposite to a side in which the measured-medium intake part is disposed, the first terminals including a third terminal and a fourth terminal;
    a first housing part sandwiching the sensor element with the measured-medium intake part and fixed to the sensor element by an adhesive in the physical quantity sensor device, the first housing part including
    a first hole in which the protruding portion of the fourth terminal is inserted to connect the sensor element to the first housing part, wherein the first hole has a cross-sectional shape in which a distance between opposing sides of a cross section of the first hole is less than a diameter of the fourth terminal, for suppressing lifting the first housing part from the sensor element during a process of curing the adhesive, such that adhesion of the sensor element and the first housing part is stabilized;

a second hole in which the protruding portion of the third terminal is inserted to at least one of adjust or trim the sensor element; and a second terminal for connecting the sensor element and external wiring.

12. The physical quantity sensor device according to claim 11, wherein the first housing part includes a number of first holes in a range from one hole to three holes.

13. The physical quantity sensor device according to claim 11, wherein the first housing part includes three first holes.

14. The physical quantity sensor device according to claim 11, wherein the sensor element includes a sensor chip that includes a sensor and a control circuit electrically connected to the sensor, the third terminal is inserted in the second hole electrically connecting the control circuit and the second terminal, and the fourth terminal is disposed in plurality, and the first hole is disposed in plurality, in each of which a corresponding one of the fourth terminals is inserted.

15. The physical quantity sensor device according to claim 11, wherein the sensor element includes a sensor chip that includes a sensor and a control circuit electrically connected to the sensor, the third terminal is disposed in plurality, and the second hole is a through-hole and is disposed in plurality in the first housing part, each third terminal being inserted into a corresponding one of the second holes to electrically connect the control circuit and the second terminal, and the fourth terminal is disposed in plurality, and the first hole is a groove and is disposed in plurality in the first housing part, each fourth terminal being inserted into a corresponding one of the first holes, the second terminal has a first part to which said each third terminal is electrically connected.

16. The physical quantity sensor device according to claim 11, wherein the first housing part is constituted by:

a second housing part that sandwiches the sensor element with the measured-medium intake part and houses the first terminals, the second terminal forming the connector part for the external wiring is arranged in the second housing part; and a third housing part that sandwiches the second housing part with the sensor element and houses the second terminal.

\* \* \* \* \*